United States Patent [19]

Konishi

[11] Patent Number: 5,063,830
[45] Date of Patent: Nov. 12, 1991

[54] BRAKE BOOSTER

[75] Inventor: Masaru Konishi, Saitama, Japan

[73] Assignee: Jidosha Kiki Co., Ltd., Tokyo, Japan

[21] Appl. No.: 651,029

[22] Filed: Feb. 5, 1991

[30] Foreign Application Priority Data

Mar. 5, 1990 [JP] Japan ................................. 2-53448

[51] Int. Cl.$^5$ .......................... F01B 11/00; F15B 9/10
[52] U.S. Cl. .................................. 92/169.2; 92/169.1;
91/369.2; 91/376 R; 91/533; 60/547.1
[58] Field of Search .................. 92/48, 98 R, 146, 161,
92/169.1, 169.2; 91/369.2, 376 R; 60/547.1, 533

[56] References Cited

U.S. PATENT DOCUMENTS

| 4,358,990 | 11/1982 | Takeuchi et al. | 91/369.2 |
|---|---|---|---|
| 4,445,331 | 5/1984 | Weiler et al. | 60/547.1 |
| 4,453,380 | 6/1984 | Meynier | 60/547.1 |
| 4,466,246 | 8/1984 | Furuta et al. | |
| 4,475,337 | 10/1984 | Meynier | 60/547.1 |
| 4,512,237 | 4/1985 | Endoh et al. | |
| 4,516,474 | 5/1985 | Ochiai | 60/547.1 |
| 4,522,108 | 6/1985 | Takeuchi et al. | 92/169.1 |
| 4,658,704 | 4/1987 | Mori et al. | |
| 4,671,167 | 6/1987 | Endo et al. | 91/376 R |
| 4,689,958 | 9/1987 | Arino et al. | |
| 4,726,189 | 2/1988 | Arino et al. | |
| 4,862,787 | 9/1989 | Suzuki et al. | |

FOREIGN PATENT DOCUMENTS 60-203566 10/1985 Japan .

Primary Examiner—Edward K. Look
Assistant Examiner—Thomas Denion
Attorney, Agent, or Firm—Flynn, Thiel, Boutell & Tanis

[57] ABSTRACT

An improvement relating to a front shell of a brake booster and a reinforcing plate which is connected to and extends along the inner surface of the front shell is disclosed. A radially inward portion of the front shell is formed with a cylindrical section which extends rearwardly, and an end face which provides a mounting surface for a master cylinder is defined adjacent to the rear end of the cylindrical section. The reinforcing plate is formed with a cylindrical portion which is fitted around the cylindrical section of the front shell, and an end face which is disposed in overlapping relationship with the end face of the front shell. This allows the rigidity of the front shell to be increased without requiring the welding of the reinforcing plate to the front shell.

12 Claims, 2 Drawing Sheets 5,063,830

BRAKE BOOSTER

FIELD OF THE INVENTION

The invention relates to a brake booster, and more particularly, to an improvement of a front shell and a reinforcing plate thereof for a brake booster.

DESCRIPTION OF THE PRIOR ART

A brake booster is known in the art including a front shell having a mounting surface which is connected to a master cylinder, and a reinforcing plate which is connected to and extends along the inner surface of the mounting surface of the front shell.

The front shell of a conventional brake booster includes a wall surface which bulges out in a forward direction to define a frustoconical configuration which increases the rigidity. The front shell is also formed with a flat surface located nearer the axis than the frustoconical configuration which provides a mounting surface for a master cylinder. In the conventional construction, a reinforcing plate comprising an annular plate-like member is disposed in overlapping relationship with the back side of the flat surface of the front shell, and is welded thereto.

A brake booster having a frustoconical configuration which bulges out in a rearward direction, in contrast to the described arrangement, is also known (see, for example, Japanese Laid-Open Patent Application No. 203,566/1985).

Conventional brake boosters as described above suffers from a disadvantage that a flat reinforcing plate must be welded to the flat surface of the front shell in order to assure a sufficient rigidity thereof.

SUMMARY OF THE INVENTION

In view of the foregoing, the invention provides a brake booster including a front shell having a mounting surface which is connected to a master cylinder, and a reinforcing plate connected to and extending along the inner surface of the mounting surface of the front shell. In accordance with the invention, the front shell comprises a first cylindrical section which is located radially outermost, a frustoconical section extending radially inward from the front end of the first cylindrical section and disposed so as to be inclined toward the front side at a given angle with respect to a plane which is perpendicular to the axis, a second cylindrical section folded back rearwardly from the front end of the frustoconical section, and an end face extending from the rear end of the second cylindrical section and folded back radially inward to provide a mounting surface to which a master cylinder is connected. On the other hand, the reinforcing plate comprises an end face defined by an annular flat plane, and a cylindrical portion extending from the outer periphery of the end face axially forward through a given distance. The reinforcing plate is fitted around the second cylindrical section of the front shell and the end face of the reinforcing plate is disposed in overlapping relationship with the end face of the front shell, thus maintaining the cylindrical portion of the reinforcing plate in close contact with the outer peripheral surface of the second cylindrical section of the front shell.

With this arrangement, the rigidity of the front shell may be increased without welding the reinforcing plate to the front shell. Thus, after the completion of mounting the brake booster on a car body to transmit a forward drive to the front shell from the master cylinder, the end face of the front shell which is connected to the master cylinder will be driven forwardly. Concurrently, the second cylindrical section of the front shell as well as the junction between the second cylindrical section and the frustoconical section will be urged radially outward. However, because the cylindrical portion of the reinforcing plate is fitted around the second cylindrical section of the front shell and the end face of the reinforcing plate is disposed in overlapping relationship with the end face of the front shell, if the forward drive is applied to the front shell, the second cylindrical section as well as the junction between the second cylindrical section and the frustoconical section will be prevented from being urged radially outward to increase their diameters. Since a deformation of the junction between the second cylindrical section and the frustoconical section of the front shell can be prevented by the provision of the reinforcing plate, the rigidity of the front shell may be improved over the prior art.

Above and other objects, features and advantages of the invention will become apparent from the following description of several embodiments thereof with reference to the drawings.

DETAILED DESCRIPTION OF EMBODIMENTS

Figure 1:
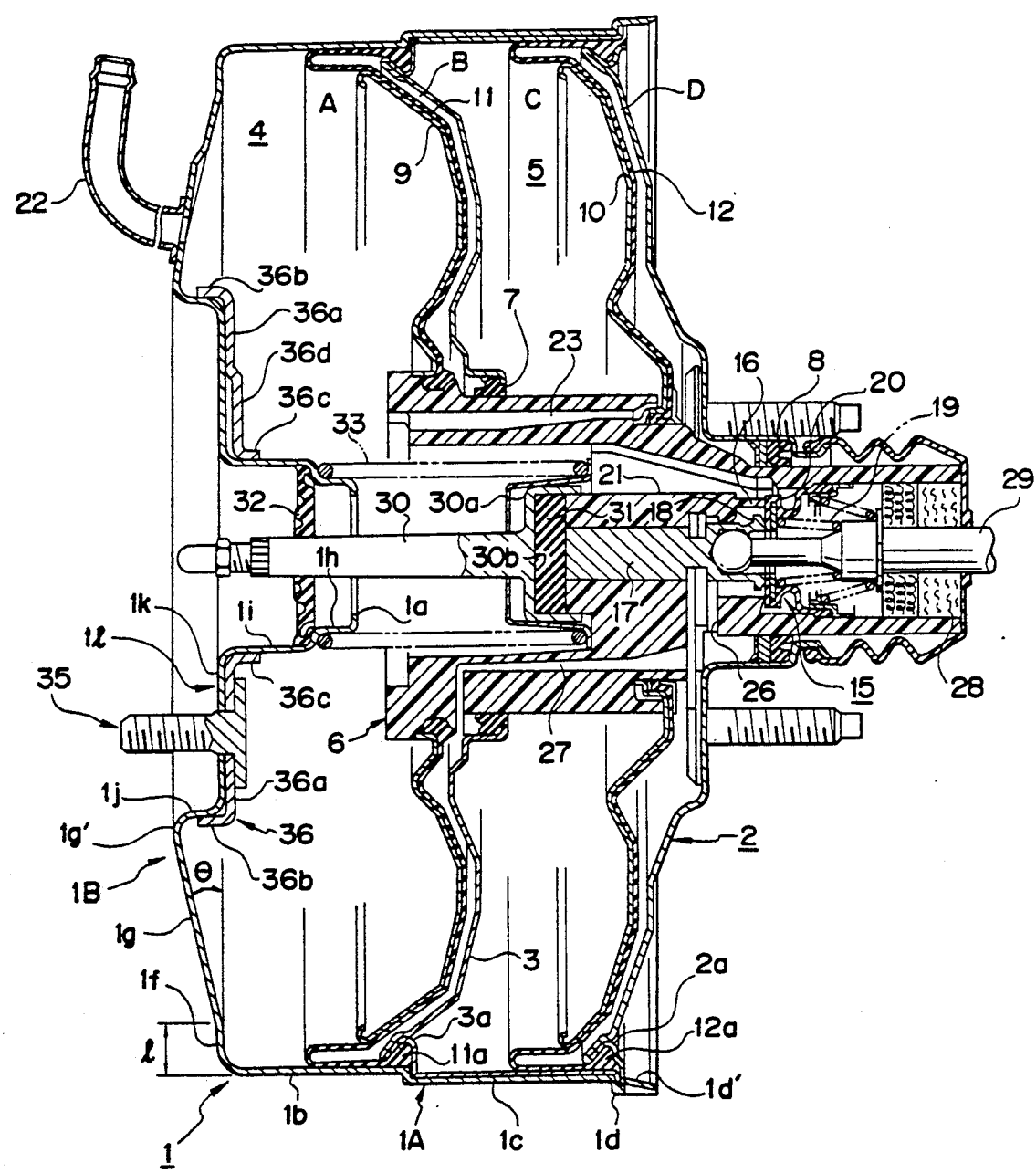
FIG. 1 is a longitudinal section, partly in side elevation, of a brake booster according to one embodiment of the invention.

Referring to the drawings, several embodiments shown will be described. In FIG. 1, an enclosed vessel is defined by a front shell 1 and a rear shell 2, and a center plate 3 disposed centrally within the vessel divides the interior thereof into a front chamber 4 and a rear chamber 5, which are disposed on the opposite sides of the center plate 3. A substantially cylindrical valve body 6 slidably extends through axial portions of the rear shell 2 and the center plate 3 while maintaining a hermetic seal by means of annular seal members 7, 8.

Connected to the valve body 6 are a front and a rear power piston 9, 10, respectively, which are disposed in the front and the rear chamber 4, 5, respectively. A front and a rear diaphragm 11, 12 are applied to the back surfaces of the respective power pistons 9, 10, thus defining a constant pressure chamber A and a variable pressure chamber B across the front diaphragm 11 and also a constant pressure chamber C and a variable pressure chamber D across the rear diaphragm 10.

The valve body 6 contains a valve mechanism 15 which switches a fluid circuit between the pair of constant pressure chambers A, C and the pair of variable pressure chambers B, D. Specifically, the valve mechanism 15 comprises an annular, first valve seat 16 formed on the valve body 6, an annular, second valve seat 18 which is located radially inward of the first seat 16 and which is formed on the right end of a valve plunger 17 which is slidably disposed in the valve body 6, and a valve element 20 which is adapted to be seated upon either valve seat 16 or 18 from the right, as viewed in FIG. 1, under the resilience of a spring 19.

A space located radially outward of an annular seat defined by the engagement between the first valve seat 16 and the valve element 20 communicates with the constant pressure chamber A through an axial constant pressure passage 21 which is formed in the valve body 6. The constant pressure chamber A communicates with an intake manifold, not shown, through a tubing 22 mounted on the front shell 1 for introducing a negative pressure. The chamber also communicates with the constant pressure chamber C through a second axial constant pressure passage 23 also formed in the valve body 6.

On the other hand, a space which is disposed radially inward of the annular seat defined by the engagement between the first valve seat 16 and the valve element 20 and which is disposed radially outward of another annular seat defined by the engagement between the second valve seat 18 and the valve element 20, or located intermediate the both annular seats, communicates with the variable pressure chamber D through a radial variable pressure passage 26 which is formed in the valve body 6, and thence with the variable pressure chamber B through a further variable pressure passage 27 formed in the valve body 6.

Finally, a space which is disposed radially inward of the inner annular seat defined by the engagement between the second valve seat 18 and the valve element 20 communicates with the atmosphere through a filter 28.

The valve plunger 17 which is slidably disposed within the valve body 6 has its right end connected to an input shaft 29 which is in turn coupled to a brake pedal, not shown. The left end of the valve plunger 17 is disposed in opposing relationship with the right end face of a reaction disc 31 disposed within a recess 30$b$ which is formed in one end 30$a$ of a push rod 30. The left end of the push rod 30 slidably extends through a seal member 32 and an opening 1$a$ formed in the axial portion of the front shell 1 to project externally thereof for connection with the piston of a master cylinder, not shown. The valve body 6 is normally maintained in its inoperative position shown by a return spring 33.

The described arrangement is essentially the same in construction as a conventional brake booster of tandem type. However, in the present embodiment, the front shell 1 comprises a cylindrical, outer peripheral section 1A which is disposed radially outermost and including two steps formed therein so that its diameter increases from its front side toward the rear side, and a front wall 1B extending from the front end of the outer peripheral section 1A and including an end face defined in its axial portion which is connected to a master cylinder, not shown.

Specifically, the section 1A includes a portion 1$b$ of a reduced diameter and a portion 1$c$ of an intermediate diameter, and at a location corresponding to the boundary or the step between the both portions 1$b$, 1$c$, a bead 11$a$ extending around the outer periphery of the front diaphragm 11 is held between the inner peripheral surface of the front shell or the outer peripheral section 1A and a retainer 3$a$ carried by the center plate 3. The periphery of the center plate 3 extends rearwardly beyond the retainer 3$a$ to a location corresponding to the boundary or a step between the portion 1$c$ of an intermediate diameter and a further portion 1$d$ of a greater diameter of the front shell 1 generally in conformity to the configuration of the inner surface thereof to be disposed in overlapping relationship with such inner surface to be fitted therein. At a location corresponding to the boundary between the portions 1$c$ and 1$d$ of intermediate and greater diameters of the front shell 1, a bead 12$a$ extending around the outer periphery of the rear diaphragm 12 is held between the inner peripheral surface of the center plate 3 which overlaps the front shell 1 and a retainer 2$a$ carried by the rear shell 2. The outer peripheral edge of the rear shell 2 is fitted into the portion 1$d$ of a greater diameter of the front shell 1, and at a given circumferential position around the portion 1$d$ of a greater diameter, the front shell 1 is caulked as shown at 1$d'$, thereby integrally connecting the front shell 1 and the rear shell 2 together.

The front wall 1B includes a flat surface 1$f$ which is formed by a front end of the portion 1$b$ of the cylindrical, outer peripheral section 1A which is folded at right angles to be directed radially inward and which is thus located radially outermost, and a frustoconical section 1$g$ which continues from the radially inward end of the flat surface 1$f$ and disposed to be inclined forwardly with a given angle $\theta$ with respect to the flat surface 1$f$.

In the present embodiment, it is to be noted that the frustoconical section 1$g$ is defined, not by directly slanting from the position of the front end of the portion 1$b$ of a reduced diameter in a forward direction, but that the front surface 1$f$ located radially outermost is once formed, and then is slanted forwardly starting from the flat surface 1$f$. This allows the angle 8 to be increased as compared with an arrangement in which the flat surface 1$f$ is not provided. This assures a required strength without increasing the thickness of the sheet which forms the flat surface 1$f$ and the frustoconical section 1$g$. It will be appreciated that the relationship between the radial length 1 of the flat surface 1$f$ and the angle $\theta$ directly influences upon the strength of the frustoconical section 1$g$ and the flat surface 1$f$, and thus is chosen to provide a maximum strength for the frustoconical section 1$g$ and the flat surface 1$f$ when using the same sheet thickness.

A radially inner portion of the front wall 1B which continues from the frustoconical section 1$g$ extends through a given distance rearwardly to provide three stepped cylindrical portions having diameters which sequentially decrease toward the rear side. A rearmost one of the stepped cylindrical portions, or rearmost portion 1$h$ of a reduced diameter has its end formed with an opening 1$a$. At a location between the portion 1$h$ and another portion 1$i$ of an intermediate diameter, the seal member 32 is mounted on the inner surface of the step thus defined so as to extend across the output shaft 30.

In the present embodiment, a stepped end face 1$k$ is defined between the portion 1$i$ of an intermediate diameter and a third one of the stepped cylindrical portions or a portion 1$j$ of a greater diameter, and this defines a bulge 1$l$ together with the portion 1$j$. A reinforcing plate 36 to be described later is disposed as a press fit against the inside of the bulge 1$l$.

In the embodiment shown, the reinforcing plate 36 is disposed in overlapping relationship with the internal wall of the bulge 1$l$, and the shank of a mounting bolt 35 is passed through openings formed in both the reinforcing plate 36 and the stepped end face 1$k$, which forms the bulge 1$l$, thus connecting the stepped end face 1$k$ of the front shell 1 to a master cylinder, not shown. In other words, in this embodiment, the stepped end face 1$k$ of the front shell 1 represents a mounting surface for the master cylinder. It is to be noted that the stepped end face 1$k$ extends in a plane perpendicular to the axis of the brake booster and is located slightly rearward of the flat surface 1$f$ mentioned above. Accordingly, when the stepped end face 1$k$ is connected to the master cylinder by means of the bolt 35, a mounting surface which is provided on the part of the master cylinder will be positioned slightly rearward of the flat surface 1f with some overlap, thus substantially reducing the axial length of the front shell 1.

The axial size of the greater diameter portion 1j, or the distance through which the bulge 1l extends rearwardly, is chosen to have a suitable value so that upon completion of the assembly of the brake booster with a vehicle, a forward movement of the input shaft 29 to drive the valve body 6 to its foremost end does not result in an interference caused by the front end of the valve body 6.

The reinforcing plate 36 is formed by an annular plate material which defines a flat end face 36a. The outer peripheral edge of the end face 36a extends axially forward through a given distance while the inner peripheral edge of the end face 36a extends axially rearward through a given distance, thus defining an outer peripheral cylindrical portion 36b and an inner peripheral cylindrical portion 36c.

When the reinforcing plate 36 is disposed as a press fit against the inner wall of the bulge 1l of the front shell 1 in the manner mentioned above, the outer peripheral cylindrical portion 36b will be closely fitted around the greater diameter portion 1j, which forms the bulge 1l, and the end face 36a will be disposed in overlapping relationship with the stepped end face 1k of the front shell 1 while the inner peripheral cylindrical portion 36c of the reinforcing plate 36 will be closely fitted around the outer peripheral surface of the intermediate diameter portion 1i of the front shell 1 simultaneously.

In this embodiment, the axial size of the outer peripheral cylindrical portion 36b is chosen to be less than the axial size of the greater diameter portion 1j of the front shell 1, so that when the reinforcing plate is disposed as a press fit against the bulge 1l in the manner mentioned above, a required clearance will be formed between the front end of the cylindrical portion 36b and the inner surface of the frustoconical section 1g of the front shell 1.

The end face 36a of the reinforcing plate 36 is formed with an opening in alignment with an opening formed in the stepped end face 1k of the front shell 1 so as to allow the shank of the mounting bolt 35 to be passed therethrough. Thus, when disposing the reinforcing plate 36 as a press fit against the bulge 1l, the openings formed in the stepped end face 1k and the end face 36a will be aligned to each other so as to receive the bolt 35.

At equi-angular positions around the circumference, the end face 36a of the reinforcing plate 36 is formed with bulges 36d which projects rearwardly in order to further increase the strength of the reinforcing plate 36 itself. It is to be noted that the inner peripheral cylindrical portion 36c of the reinforcing plate 36 may be omitted if desired.

As mentioned, in the present embodiment, the described configuration of the reinforcing plate 36 permits it to be simply disposed as the press fit against the inner wall of the bulge 1l of the front shell 1 without requiring a welding operation of a reinforcing plate 36 to the inner wall of the front shell 1 as experienced in the prior art, thus simplifying the assembly of the brake booster.

It is also to be noted that in the present embodiment, the stepped end face 1k of the front shell 1 which provides a mounting surface for a master cylinder is positioned rearward of the front surface 1f, and accordingly, the axial size of the front shell 1 may be substantially reduced as compared with a conventional arrangement by a corresponding amount, thus allowing the axial size of the entire brake booster to be reduced.

It is also to be noted that the described configuration of the front wall 1B of the front shell 1 enables the rigidity of the front wall 1B to be increased as compared with a conventional construction. Specifically, when the brake booster is mounted on a car body, and a brake pedal is depressed to bring the input shaft 29 to its foremost position, the stepped end face 1k of the front shell 1 which is connected to a master cylinder, not shown, through the mounting bolt 35 will be strongly urged to the left. As the stepped end face 1k is strongly urged to the left, the greater diameter portion 1j and a junction 1g' formed between the greater diameter portion 1j and the frustoconical section 1g will be driven radially outward to increase their diameters. However, in the embodiment described above, a resulting deformation of the greater diameter portion 1j and the junction 1g' will be prevented by the provision of the outer cylindrical portion 36b of the reinforcing plate 36 which is held in close contact with the greater diameter portion 1j.

Accordingly, in the present embodiment, the reinforcing plate 36 is effective to prevent any deformation of the mounting surface (stepped end face 1k) for the master cylinder as well as its junction with the frustoconical section 1g of the front shell 1 entirely, thus allowing the rigidity thereof to be increased without increasing the sheet thickness of the front shell 1.

Figure 2:
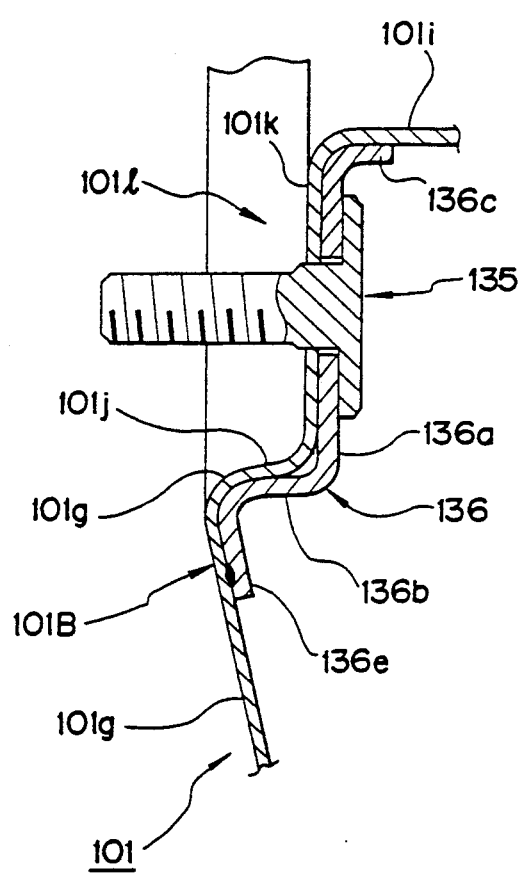
FIG. 2 is a similar section of part of another embodiment of the invention.

FIG. 2 shows a second embodiment of the invention. In the second embodiment, a front end of an outer peripheral cylindrical portion 136b of a reinforcing plate 136 is extended through a given distance radially outward in conformity to the configuration of a frustoconical section 101g to define an outer overlapping portion 136e. The outer overlapping portion 136e is disposed also in overlapping relationship with a junction 101g and the frustoconical section 101g of a front shell 101 with a spot welding between the frustoconical section 101g and the outer overlapping portion 136e of the reinforcing plate 136. In other respects, the arrangement is similar to that of the first embodiment.

With the second embodiment, the rigidity of the front shell 101 can be further enhanced as compared with the first embodiment while allowing a substantial reduction of the axial size of the entire brake booster in the similar manner as in the first embodiment.

In the both embodiments described above, the stepped end face 1k (101k) of the front shell 1 (101) which provides a mounting surface for the master cylinder is positioned rearward of the flat surface 1f, but the stepped end face 1k (101k) may be disposed in co-planar relationship with the flat surface 1f.

While the invention has been described above as applied to a brake booster of tandem type, it should be understood that it may equally be applied to a brake booster of either single type or triple type.

While the invention has been described above in connection with several embodiments thereof, it should be understood that a number of changes, modifications and substitutions therein will readily occur to one skilled in the art from the above disclosure without departing from the scope and spirit of the invention defined by the appended claims.

What is claimed is:

1. A brake booster including a front shell having a mounting surface connected to a master cylinder, and a reinforcing plate which is connected to and extending along the inside of the mounting surface of the front shell; characterized in that the front shell comprises a first cylindrical section disposed radially outermost, a frustoconical section extending from the front end of the first cylindrical section and disposed radially inward thereof and disposed so as to be inclined forwardly at a given angle with respect to a plane which is perpendicular to the axis of the front shell, a second cylindrical section folded back to extend rearwardly from the front end of the frustoconical section, and an end face formed by folding the rear end of the second cylindrical section radially inward and providing said mounting surface which is to be connected with a master cylinder, the reinforcing plate comprising an end face defined as an annular flat surface, and a cylindrical portion which extends from the outer periphery of the end face axially forwardly through a given distance, the reinforcing plate being fitted around the second cylindrical section of the front shell so that the end face of the reinforcing plate is disposed in overlapping relationship with the end face of the front shell and the cylindrical portion of the reinforcing plate is held in close contact with the outer peripheral surface of the second cylindrical section of the front shell.

2. A brake booster according to claim 1 in which the front shell includes a third cylindrical section which extends rearwardly beyond the radially inner edge of the end face which provides said mounting surface for the master cylinder.

3. A brake booster according to claim 2 in which the radially inner edge of the end face of the reinforcing plate extends rearwardly to provide an inner peripheral cylindrical portion, which is fitted around the third cylindrical section of the front shell.

4. A brake booster according to claim 1 in which the cylindrical portion of the reinforcing plate is formed with an outer overlap at its end which conforms to the configuration of the frustoconical section of the front shell, with the outer overlapping portion of the reinforcing plate disposed in overlapping relationship with the frustoconical section of the front shell.

5. A brake booster according to claim 1 in which the end face of the reinforcing plate is formed with bulges extending rearward at equi-angular positions around its circumference.

6. A brake booster according to claim 1 in which a radially extending flat surface is defined between the first cylindrical section and the frustoconical section of the front shell.

7. A brake booster according to claim 6 in which the radial size of the flat surface of the front shell and the angle of inclination of the frustoconical section of the front shell are chosen to provide a maximum strength of the front shell for an equal sheet thickness.

8. A brake booster according to claim 6 in which the end face of the front shell which provides a mounting surface for a master cylinder is positioned rearwardly of the flat surface.

9. A brake booster according to claim 2 in which the end face of the reinforcing plate is formed with bulges extending rearward at equi-angular positions around its circumference.

10. A brake booster according to claim 3 in which the end face of the reinforcing plate is formed with bulges extending rearward at equi-angular positions around its circumference.

11. A brake booster according to claim 4 in which the end face of the reinforcing plate is formed with bulges extending rearward at equi-angular positions around its circumference.

12. A brake booster according to claim 7 in which the end face of the front shell which provides said mounting surface for a master cylinder is positioned rearwardly of the flat surface.

* * * * *